United States Patent Office 3,472,917
Patented Oct. 14, 1969

3,472,917
COPOLYMERS OF 4-METHYLPENTENE-1 WITH OTHER OLEFINS
Lothar Bohn, Glashutten, Taunus, Horst Jastrow, Frankfurt am Main, Hans-Joachim Leugering, Frankfurt, and Hans-Joachim Vetter, Frankfurt am Main, Germany, assignors to Hercules Incorporated, Wilmington, Del., a corporation of Delaware
No Drawing. Filed Dec. 6, 1966, Ser. No. 599,371
Claims priority, application Germany, Dec. 10, 1965, F 47,886
Int. Cl. C08f 15/04, 1/32
U.S. Cl. 260—878     19 Claims

ABSTRACT OF THE DISCLOSURE

Novel copolymers and the process of making them which comprises sequentially polymerizing in situ in indifferent order (1) a branched olefin having the formula

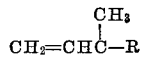

in which R is an alkyl radical of 1 to 5 carbon atoms and (2) a mixture of 4-methylpentene-1 and a linear 1-olefin having from 12 to 16 carbon atoms in the presence of a stereo-specific polymerization catalyst, said copolymer containing from 0.05 to 3% by weight of branched olefin, from 0.5 to 10% by weight of linear 1-olefin, and the remainder 4-methylpenetene-1.

---

The present invention relates to modified polymers prepared from 4-methylpentene-1, a straight-chain α-olefin of from 12 to 16 carbon atoms, and a branched α-olefin of from 5 to 9 carbon atoms containing a methyl substituent in the 3-position.

It is known to polymerize branched 1-olefins, e.g., 3-methylbutene-1, 4-methylpentene-1, 5-methylhexene-1, and 5,5-dimethylhexene-1, to form clear, transparent polymers. Further, Belgian Patent 646,737 described transparent copolymers of 4-methylpentene-1 with 0.5 to 30% by weight of a straight-chain α-olefin of 5 to 18 carbon atoms. The coplymerization of 4-methylpenetene-1 with branched 1-olefins such as 3-methylbutene-1 is known from U.S. Patent 3,091,601 and British Patent 968,935. German Patent 1,149,490 describes a process for the preparation of textile threads and fibers from drawn olefin copolymers of 75 to 90% of 4-methylpentene-1 and 10 to 25% of a straight-chain α-olefin with more than 4 carbon atoms having a small amount of divinylbenzene incorporated into the chain.

Poly(4-methylpentene-1) has a high crystalline melting point, great hardness and rigidity, but poor extensibility and toughness. Moreover, it is necessary to process the polymer within a narrow temperature range, which limits its usefulness. The impact strength can be improved by copolymerization of 4-methylpentene-1 with straight-chain 1-olefins with 4 to 24 carbon atoms, but the desirable high transparency of the polymer is lost during processing. Further, not all linear 1-olefins with 4 to 24 carbon atoms are equally suitable for the preparation of 4-methylpentene-1 copolymers. In the case of butene-1, for example, no true 4-methylpentene-1/butene-1 copolymers are formed, but mixtures of homo- and copolymers with different crystalline phases. When injection-molded parts of these copolymers are heated for a period of time to above 100° C., constituents exude, which makes the surface of the molded parts dull. Copolymers of pentene-1, hexene-1, octene-1, or decene-1 and 4-methylpentene-1 give objects with very good optical properties, but the optical properties decrease considerably upon heating to higher temperatures. On the other hand, copolymers of 4-methylpentene-1 and 1-olefins with 12 to 24 carbon atoms give very good, transparent molded articles which show, after heating to higher temperatures, less decrease in optical properties than those prepared from the polymers mentioned above. Of the above-mentioned 1-olefins with 12 to 24 carbon atoms, only those with 12 to 16 carbons atoms are practically useful because the higher olefins copolymerize with 4-methylpentene-1 in uneconomical yield. Copolymers of 4-methylpentene-1 with other branched 1-olefins give transparent products but with only fair mechanical properties, e.g., they have poor impact strength.

In accordance with the present invention, it has been found that optically excellent modified polymers (of the type commonly called "block copolymers") with good mechanical properties are formed when a random copolymer of 4-methylpentene-1 and a linear 1-olefin of 12 to 16 carbons atoms is combined with a homopolymer segment of a branched 1-olefin having the formula

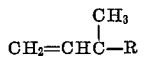

in which R is an alkyl radical of 1 to 5 carbon atoms. Thus, the invention relates to block copolymers prepared by sequentially polymerizing in situ in indifferent order (1) a branched olefin having the above formula and (2) a mixture of 4-methylpentene-1 and a linear 1-olefin having from 12 to 16 carbon atoms in the presence of a stereospecific polymerization cataylst, preferably comprising a titanium compound in which the titanium has a valence less than 4 and an organoaluminum compound. Percentagewise, the polymers contain from 0.05 to 3% by weight, preferably 0.5 to 2.2% by weight, of the branched olefin and from 0.5 to 10% by weight, preferably 1 to 6% by weight, of the linear olefin.

Such copolymers possess a particularly advantageous combination of excellent optical properties and very good mechanical properties, particularly a favorable combination of light transmission, light scattering, hardness, and toughness, which is most surprising. Moreover, the processability, i.e., moldability and extrudability, of the block copolymers of the invention is more favorable than that of the previously known homopolymer of 4-methylpentene-1 and of the known copolymers of 4-methylpentene-1 with linear olefins. Especially advantageous is the fact that a wider temperature range can be employed in processing the block copolymers of the invention without harmful effects on its properties. Still further, the block copolymers of the invention are characterized by good dimensional stability at elevated temperatures, which fact is of great importance for steam sterilization treatments. Still further, the thermal stability of the polymers is excellent; they can be worked at temperatures of 300° C. and higher when properly formulated with heat stabilizers.

Because of their toughness, transparency, and other valuable properties mentioned above, the copolymers of the invention are useful for the manufacture of bottles and other hollow objects, sheets and deep drawn objects for transparent packaging. They can be processed into such objects by the use of any of the apparatus customarily employed for polyolefin processing.

Linear olefins from which the copolymers of the invention are prepared include all of the straight-chain 1-olefins having from 12 to 16 carbon atoms, but most desirably either dodecene-1, tetradecene-1, or hexadecene-1. The preferred branched olefins for use in preparing the copolymers are 3-methylpentene-1, 3-methylbutene-1, and 3,5,5-trimethylhexene-1.

The block copolymers of the invention are prepared by techniques, now well known, in the presence of stereospecific polymerization catalysts, often referred to as Ziegler catalysts. Such catalysts are prepared simply by mixing a titanium compound in which the titanium has a valence less than 4, such as a titanium alkoxide or a titanium halide, preferably titanium trichloride, with an organoaluminum compound which contains at least one hydrocarbon radical bonded to aluminum. The preferred organoaluminum compounds include trialkyl- and triarylaluminums, especially triethylaluminum, and diaryl- and dialkylaluminum halides, particularly diethylaluminum chloride. Monoalkylaluminum compounds such as monoethylaluminum dichloride can also be used, but in this case it is essential for satisfactory results to employ a third component such as a dialkyl ether or a substituted silane in accordance with published procedures. In short, any of the known catalysts of this class that are satisfactory for making linear polyethylene or stereoregular (or isotactic) polypropylene are satisfactory for use in the invention.

The polymerization is conducted also according to known techniques simply by introducing the monomers to be polymerized into an inert liquid diluent such as a saturated aliphatic, cycloaliphatic, aromatic, or halogenated hydrocarbon liquid. Typical of these are such compounds as hexane, heptane, high boiling paraffin fractions, cyclohexane, benzene, chlorobenzene, and carbon tetrachloride. The polymerization can be carried out over a wide range of temperatures and pressures; for example, the temperature may range from about normal room temperature up to about 100° C., and any pressure which will maintain the diluent liquid without excessive evaporation can be employed. It is advantageous to recover the copolymer from the polymerization mixture by adding a small quantity of a 1,3-dicarbonyl compound, e.g., acetoacetic ethyl ester or acetylacetone, and then extracting the mixture with an alkanol of 1 to 6 carbon atoms. The polymer is then recoverable by filtration and drying. Further details of the catalyst and the polymerization procedure are believed unnecessary as these are well known in the art.

The essential feature of the process of the invention is that the polymerization of the branched olefin is carried out either before or after the copolymerization of the 4-methylpentene-1 and the linear olefin. In other words, the polymerization is carried out either by first polymerizing the branched olefin to form the desired amount of branched olefin homopolymer and then a mixture of 4-methylpentene-1 and linear olefin is copolymerized in situ in the same reaction mixture, or vice versa. It is, of course, possible to repeat this procedure, i.e., the sequential polymerization of different monomers, a plurality of times, but in practice it is simplest to carry out the polymerization sequence only once.

According to a typical method for making the copolymers of the invention, the catalyst components, e.g., diethylaluminum chloride and titanium trichloride, are added to a solvent, e.g., heptane, under nitrogen and then the branched olefin is fed to the reaction mixture for a time which may range from about 1 minute to 3 hours, depending upon the temperature employed and the specific monomer utilized. The feeding of the branched olefin is stopped and then a mixture of 4-methylpentene-1 and straight-chain olefin is introduced. This is continued until the desired amount of the latter monomers have been consumed. As mentioned above, the procedure can be reversed with the 4-methylpentene-1 and straight-chain olefin being copolymerized first, followed by the polymerization of the branched olefin alone. According to known processes, it is possible to utilize hydrogen to regulate the molecular weight of the copolymer.

The following examples are presented as specific illustrations of the invention. The titanium chloride employed in the examples was prepared by reduction of titanium tetrachloride with triethylaluminum in hexane. The titanium trichloride catalyst which precipitated from this reaction was washed with petroleum ether and then heat-treated for about 2 hours at 60 to 120° C.

Example A

One hundred (100) millimoles of diethylaluminum chloride and 50 millimoles of titanium trichloride catalyst were added to 250 ml. of heptane under a nitrogen atmosphere with stirring. The stirring was continued for 2 hours at 50° C. while introducing 10 grams of 3-methylbutene-1. The polymerization mixture was then diluted with 5 liters of heptane and polymerization was continued at 60° C. for 5 hours while heating 1000 grams of 4-methylpentene-1 and 21 grams of tetradecene-1. Having completed the polymerization, a few milliliters of acetylacetone were added to reactivate the catalyst and the reaction slurry was extracted with methanol until the washing liquid was colorless. There was recovered from the washed reaction mixture by filtration and drying 800 grams of polymer in the form of a white powder. The polymer had a reduced specific viscosity ($\eta$spec./C.) of 6.9.

Example B

One hundred (100) millimoles of diethylaluminum chloride were combined with 50 millimoles of titanium trichloride in 250 ml. of heptane under nitrogen and with stirring. The stirring was continued for 2 hours while introducing 8.5 grams of 3-methylbutene-1 at 60° C. The reaction mixture was diluted to 5 liters with hexane, and a mixture of 1000 grams of 4-methylpentene-1 and 20 grams of hexadecene-1 was introduced over a period of 6 hours at 60° C. Work-up was the same as in Example A. There was obtained 920 grams of a white polymer powder having a reduced specific viscosity of 6.2.

Example C

One hundred (100) millimoles of diethylaluminum chloride was combined with 50 millimoles of titanium trichloride in 250 ml. of a paraffinic hydrocarbon fraction having a boiling range of 150 to 200° C. under nitrogen with stirring. Stirring was continued for 2 hours at 50° C. while introducing 10 grams of 3-methylbutene-1. The reaction mixture was then diluted with additional diluent, and polymerization was continued at 65° C. for 6 hours while introducing a mixture of 1000 grams of 4-methylpentene-1 and 20 grams of dodecene-1. Work-up was as in Example A. There was obtained 900 grams of a white polymer powder having a reduced specific viscosity of 6.0.

Example D

This example was carried out by the same procedure as Example A except that the mixture of 4-methylpentene-1 and tetradecene-1 contained 1.5 volume percent of hydrogen. This resulted in a lowering of the molecular weight of the polymer to a reduced specific viscosity of 3.0.

Example E

This example was carried out in the manner of Example B except that the 3-methylbutene-1 was replaced with 3,5,5-trimethylhexene-1. There was obtained 880 grams of a white powdery polymer having a reduced specific viscosity of 5.8.

Example F

Two hundred (200) grams of 4-methylpentene-1 and 4.5 grams of tetradecene-1 was copolymerized in 1 liter of heptane containing 12 millimoles of diethylaluminum chloride and 10 millimoles of titanium trichloride over a period of 6 hours at 60° C. Following this, 2 grams of 3-methylbutene-1 was introduced over a period of 2 hours at 70° C. After recovering the polymer by the procedure of Example A, there was obtained 180 grams of a white powdery polymer having a reduced specific viscosity of 5.6.

The valuable and advantageous properties of the copolymers of the invention are further illustrated by the data contained in the tables that follow. Table I is a compilation of properties of several different random copolymers of 4-methylpentene-1 with a small amount of a linear 1-olefin. These copolymers, which are identified as Examples 1–15, are representative of prior art copolymers. In Table Ia there are given the properties of several copolymers made according to the present invention, which are identified as Examples 17–19, 21, 23, and 25. There are included for purposes of comparison in Table Ia, Examples 16, 20, 22, 24, and 26, which are copolymers outside the scope of the invention. It will be seen that the copolymer of Example 16 contains no linear 1-olefin while those of Examples 20, 22, 24, and 26 contain no branched olefin. In Tables I and Ia, ball indentation hardness was determined according to the procedure of VDE 0302, Section 6; torsion modulus, according to the procedure of ASTM D–1043; impact tensile strength, according to the procedure of DIN E–53448; impact strength, by the procedure of DIN 53453; tensile strength, ultimate tensile strength, and elongation at break were determined by stretching test samples at the rate of 125 millimeters per minute at 20° C. Elongation at break (electronic) and time until break were determined by the procedure of DIN E–53448. Melting point and recrystallization point were determined by differential thermal analysis. All polymers whose properties are summarized in Tables I and Ia were stabilized with 0.45% of 2,6-di-tert-butyl-p-cresol and 0.2% of trilauryl phosphite.

A comparison of the properties of the copolymers of the invention shows that they have an improved hardness-toughness relationship and a higher melting point and a higher recrystallization temperature as compared to the copolymers of the prior art.

TABLE I.—PROPERTIES OF 4-METHYLPENTENE-1 COPOLYMERS WITH LINEAR OLEFINS

| | Example Number | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Linear olefin (percent) | 1.6 | 1.7 | 1.3 | 1.5 | 3.6 | 2.9 | 3.4 | 3.2 | 9 | 9 | 9.9 | 7.9 | 8.3 | 6.5 | 4.7 |
| Linear olefin (No. carbon atoms) | $C_{12}$ | $C_{14}$ | $C_{16}$ | $C_{18}$ | $C_8$ | $C_{12}$ | $C_{14}$ | $C_{16}$ | $C_4$ | $C_6$ | $C_8$ | $C_{12}$ | $C_{14}$ | $C_{16}$ | $C_{18}$ |
| Melt index (g./10 minutes) [a] | 0.1 | 0.1 | 0.1 | 0.1 | 0.2 | 0.1 | 0.1 | 0.1 | 8 | 5 | 0.3 | 0.1 | 0.5 | 0.1 | 0.1 |
| Reduced specific viscosity [b] | 9 | 8.6 | 9 | 6.9 | 7.0 | 9 | 9 | 9.5 | 4 | 4 | 7.0 | 9 | 6.7 | 10.3 | 8.9 |
| Ball indentation hardness (kg./cm.²) | 645/553 | 655/573 | 650/559 | 669/578 | 660/569 | 493/410 | 584/455 | 575/483 | 449/381 | 483/412 | 339/281 | 261/209 | 260/209 | 304/249 | 376/312 |
| Torsion modulus at 80° C. (kg./cm.²) | 481/354 | 433/336 | 456/380 | 466/369 | 479/379 | 371/285 | 355/284 | 351/296 | 318/225 | 428/340 | | 180/146 | 223/188 | 239/215 | 318/244 |
| Torsion modulus at 120° C. (kg./cm.²) | 275/211 | 250/217 | 241/189 | 281/249 | 276/216 | 169/146 | 194/165 | 192/154 | 181/151 | 252/207 | | 75/57 | 92/85 | 117/104 | 149/127 |
| Impact tensile strength (cm. kg./cm.²) | 40 | 61 | 53 | 57 | 40 | 135 | 265 | 166 | 51 | 33 | 521 | 590 | 757 | 639 | 79 |
| Impact strength (cm. kg./cm.²) | 14 | 25 | 19 | 14 | 36 | OBD | OBD | OBD | 12 | 11 | OBD | OBD | OBD | OBD | OBD |
| Tensile strength (kg./cm.²) | | 227 | 231 | 229 | 264 | 237 | 221 | 211 | 207 | 240 | 239 | 145 | 120 | 161 | 211 |
| Ultimate tensile strength (kg./cm.²) | 298 | 159 | 148 | 139 | 170 | 161 | 148 | 158 | 139 | 129 | 172 | 159 | 151 | 165 | 177 |
| Elongation at break (percent) | 36 | 76 | 52 | 91 | 60 | 98 | 126 | 146 | 87 | 73 | 113 | 344 | 342 | 388 | 329 |
| Elongation at break (percent) [c] | 5 | 6 | 9 | 5 | 5 | 10 | 15 | 12 | | | 50 | 68 | 80 | 64 | 20 |
| Time until break (msec.) [c] | 0.35 | 0.44 | 0.7 | 0.4 | 0.4 | 0.8 | 1.12 | 0.95 | | | 4 | 5.6 | 7.0 | 5.6 | 1.6 |

[a] ASTM D 1238-57T at 250° C. with 5 kg. load.
[b] Measured on 0.1% solution in decahydronaphthalene.
[c] Force-time diagram taken electronically.
OBD = No break; elongation only.

TABLE Ia.—PROPERTIES OF 4-METHYLPENTENE-1 COPOLYMERS

| | Example Number | | | | | | | | | | |
|---|---|---|---|---|---|---|---|---|---|---|---|
| | 16 | 17 | 18 | 19 | 20 | 21 | 22 | 23 | 24 | 25 | 26 |
| Branched olefin [b] | 3-methyl-butene-1 | 3-methyl-butene-1 | [e] i-Nonene | 3-methyl-butene-1 | None | 3-methyl-butene-1 | None | 3-methyl-butene-1 | None | 3-methyl-butene-1 | None |
| Linear olefin (percent) | None | 1.4 | 1.8 | 2.8 | 2 | 6 | 5.8 | 6.8 | 6.2 | 1.8 | 1.5 |
| Linear olefin (No. carbon atoms) | | $C_{14}$ | $C_{14}$ | $C_{14}$ | $C_{14}$ | $C_{16}$ | $C_{16}$ | $C_{14}$ | $C_{14}$ | $C_{12}$ | $C_{12}$ |
| Melt index (i₅, 250° C.) [a] | 6 | 9.7 | 8 | 9 | 7 | 7 | 10 | 7 | 8 | 9.7 | 9 |
| Reduced specific viscosity [b] | 3.2 | 3 | 3.4 | 3 | 3.5 | 3.3 | 2.8 | 3.5 | 3 | 3.1 | 3 |
| Ball indentation hardness | 860/780 | 854/750 | 801/739 | 608/526 | 605/493 | 370/305 | 364/285 | 360/301 | 361/303 | 693/611 | 730/641 |
| Torsion modulus (80° C.) | 864/646 | 841/643 | 821/642 | 652/547 | 471/387 | 358/284 | 298/231 | 350/303 | 255/188 | 757/581 | 578/453 |
| Torsion modulus (120° C.) | 498/455 | 492/419 | 533/456 | 396/337 | 279/251 | 179/157 | 133/118 | 183/160 | 108/88 | 393/324 | 274/227 |
| Impact tensile strength | 14 | 22 | 26 | 34 | 28 | 235 | 168 | 230 | 186 | 29 | 12 |
| Impact strength | 6 | 8 | 9 | 14 | 8 | OBD | OBD | OBD | OBD | 8 | 6 |
| Tensile strength | | | | | | 211 | 176 | 213 | 175 | | |
| Ultimate tensile strength | 318 | 316 | 311 | 285 | 263 | 177 | 133 | 135 | 132 | 323 | 264 |
| Elongation at break (percent) | 14 | 20 | 20 | 35 | 26 | 182 | 164 | 171 | 231 | 35 | 12 |
| Melting point (° C.) | 228 | 227 | 226 | 226 | 225 | 220 | 218 | 217 | 217 | 225 | 223 |
| $T_k$ (° C.) [c] | 219 | 217 | 210 | 213 | 201 | 208 | 199 | 205 | 195 | 209 | 200 |

[a] ASTM D 1238-57T at 250° C. and 5 kg. load.
[b] Measured on 0.1% solution in decahydronaphthalene.
[c] Recrystallization temperature determined by cooling melt from 270° C. at rate of 3° per min.
[d] In all cases the amount was 1% of total polymer.
[e] i—Nonene=3,5,5-trimethylhexene-1.
OBD = No break; elongation only.

There follow in Tables II and IIa data on the optical properties of the copolymers of the invention which are compared to the optical properties of prior art copolymers. These properties were measured on molded plaques 4 millimeters thick by means of an Ulbricht sphere-type photometer. The measurements in Table II are the optical properties of several prior art copolymers of 4-methylpentene-1 and a linear 1-olefin. In table IIa, Example 38–44 and Example 46 are copolymers made according to the invention while Examples 37 and 45 are included as controls. As can be seen from Tables II and IIa, the copolymers of the invention are distinguished by the ability to maintain their initial optical properties after being tempered (held for 4 hours at 180° C. and then cooled at the rate of 100° per hour).

TABLE II

| Example | Percent Co-Olefin | Transmission before Tempering, percent | Transmission after Tempering, percent | Difference Δ | Scattering before Tempering, percent | Scattering after Tempering, percent | Difference Δ |
|---|---|---|---|---|---|---|---|
| 27 | 5% Butene-1 | 89 | | | 27 | | |
| 28 | 4% Hexene-1 | 89 | 86 | 3 | 26 | 45 | 19 |
| 29 | 2.8% Octene-1 | 90 | 87 | 3 | 31 | 59 | 28 |
| 30 | 5% Octene-1 | 88 | 86 | 2 | 28 | 62 | 34 |
| 31 | 1.2% $C_{12}$-Olefin | 89 | 88 | 2 | 28 | 38 | 10 |
| 32 | 2.9% $C_{12}$-Olefin | 89 | 87 | 2 | 26 | 37 | 11 |
| 33 | 2% $C_{14}$-Olefin | 89 | 89 | 0 | 27 | 37 | 10 |
| 34 | 3.4% $C_{14}$-Olefin | 89 | 87 | 2 | 25 | 36 | 11 |
| 35 | 2% $C_{16}$-Olefin | 90 | 89 | 1 | 28 | 40 | 12 |
| 36 | 1.9% $C_{16}$-Olefin | 89 | 89 | 0 | 26 | 35 | 9 |

TABLE IIa

| Example | Percent Co-Olefin | Transmission before Tempering, percent | Transmission after Tempering, percent | Difference Δ | Scattering before Tempering, percent | Scattering after Tempering, percent | Difference Δ |
|---|---|---|---|---|---|---|---|
| 37 | 1% 3-methyl butene-1 | 88 | 85 | 3 | 20 | 31 | 11 |
| 38 | 2% $C_{12}$-Olefin, 1% 3-methylbutene-1 | 89 | 88 | 1 | 15 | 19 | 4 |
| 39 | 2% $C_{14}$-Olefin, 1% 3-methylbutene-1 | 89 | 87 | 2 | 17 | 19 | 2 |
| 40 | 1.8% $C_{14}$-Olefin, 1% 3-methylbutene-1 | 90 | 88 | 2 | 15 | 18 | 3 |
| 41 | 2.0% $C_{16}$-Olefin, 1% 3-methylbutene-1 | 89 | 88 | 1 | 18 | 22 | 4 |
| 42 | 2% $C_{12}$-Olefin, 1.3% 3-methylbutene-1 | 89 | 87 | 2 | 17 | 21 | 4 |
| 43 | 2% 3-methylbutene, 5% $C_{14}$-Olefin | 90 | 87 | 3 | 17 | 24 | 7 |
| 44 | 2% 3-methylbutene, 8% $C_{14}$-Olefin | 89 | 87 | 2 | 21 | 30 | 9 |
| 45 | 1% i-Nonene* | 89 | 87 | 2 | 28 | 36 | 8 |
| 46 | 1.2% i-Nonene,* 2.5% $C_{14}$-Olefin | 90 | 89 | 1 | 17 | 22 | 5 |

*i-Nonene=3,5,5-trimethylhexene-1.

What we claim and desire to protect by Letters Patent is:

1. The process of preparing block copolymers which comprises sequentially polymerizing in situ in indifferent order (1) a branched olefin having the formula

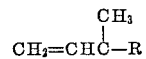

in which R is an alkyl radical of 1 to 5 carbon atoms and (2) a mixture of 4-methylpentene-1 and a linear 1-olefin having from 12 to 16 carbon atoms in the presence of a stereospecific polymerization catalyst, said copolymer containing from 0.05 to 3% by weight of branched olefin, from 0.5 to 10% by weight of linear 1-olefin, and the remainder 4-methylpentene-1.

2. The process of claim 1 in which the branched olefin is 3-methylbutene-1.

3. The process of claim 1 in which the branched olefin is 3-methyl-5,5-dimethylhexene-1.

4. The process of claim 1 in which the branched olefin is 3-methylpentene-1.

5. The process of claim 1 in which the linear 1-olefin is tetradecene-1.

6. The process of claim 1 in which the linear 1-olefin is hexadecene-1.

7. The process of claim 1 in which the linear 1-olefin is dodecene-1.

8. The process of claim 1 in which the stereospecific catalyst comprises a titanium compound in which the titanium has a valence less than 4 and an organoaluminum compound.

9. The process of claim 1 in which the branched olefin is first polymerized followed by copolymerization of 4-methylpentene-1 and the linear 1-olefin.

10. The process of claim 1 in which 4-methylpentene-1 is first copolymerized with the linear 1-olefin followed by polymerization of the branched olefin.

11. The product produced by the process of claim 1.
12. The product produced by the process of claim 2.
13. The product produced by the process of claim 3.
14. The product produced by the process of claim 4.
15. The product produced by the process of claim 5.
16. The product produced by the process of claim 6.
17. The product produced by the process of claim 7.
18. The product produced by the process of claim 9.
19. The product produced by the process of claim 10.

References Cited

UNITED STATES PATENTS 3,405,108  10/1968  Clark _____ 260—878

FOREIGN PATENTS 1,030,797  5/1966  Great Britain.

MURRAY TILLMAN, Primary Examiner

JOHN T. GOOLKASIAN, Assistant Examiner

PO-1050
(5/69)

UNITED STATES PATENT OFFICE
CERTIFICATE OF CORRECTION

Patent No. 3,472,917      Dated October 14, 1969

Inventor(s) Bohn, Jastrow, Leugering & Vetter Case 1

It is certified that error appears in the above-identified patent and that said Letters Patent are hereby corrected as shown below:

Table Ia, Pg. 5-6, 1st line "Branched olefin b" should read --Branched olefin d--

Table Ia, last line, "$T_k$ (°C.)$^e$" should read ---$T_k$ (°C.)$^c$--

SIGNED AND
SEALED
JAN 20 1970

(SEAL)
Attest:

Edward M. Fletcher, Jr.
Attesting Officer

WILLIAM E. SCHUYLER, JR.
Commissioner of Patents